INVENTOR:
WILLIAM F. CONCANNON
BY Howson & Howson
ATTYS.

Jan. 3, 1967 W. F. CONCANNON 3,295,562
METHOD AND APPARATUS FOR ROUTING AND LAYING WIRES
Filed Jan. 5, 1965 6 Sheets-Sheet 3

INVENTOR:
WILLIAM F. CONCANNON
BY
Howson & Howson
ATTYS.

Jan. 3, 1967 W. F. CONCANNON 3,295,562
METHOD AND APPARATUS FOR ROUTING AND LAYING WIRES
Filed Jan. 5, 1965 6 Sheets-Sheet 4

INVENTOR:
WILLIAM F. CONCANNON
BY Howson & Howson
ATTYS.

INVENTOR
WILLIAM F. CONCANNON
BY
Howson & Howson
ATTYS.

United States Patent Office 3,295,562
Patented Jan. 3, 1967

3,295,562
METHOD AND APPARATUS FOR ROUTING AND LAYING WIRES
William F. Concannon, 30 Dewey Road,
Cheltenham, Pa. 19012
Filed Jan. 5, 1965, Ser. No. 423,445
16 Claims. (Cl. 140—93)

The present invention relates to a method and apparatus for routing and laying wires and, more specifically, to a method and apparatus for automatically routing and laying a plurality of wires in large frame structures.

In the wiring of large panel-type structures, for example, relay, control and the like structures, heavy, large current carrying conductors must be routed through the panels and terminate therein for connection to external sources and internal terminations. When wiring a structure such as described, a plurality of heavy wires are usually laid in various routing patterns throughout the edges or rim portions of the structure so as to enable mounting within the structure electrical or mechanical components. The wires routed and laid will range in stiffness and heaviness from 6 to 18 gauge wire. Because of the heaviness and thickness of the wires, only a few wires may be routed at any one time and because of the necessity of bending the wires to conform to the particular routing path through the structure along the rim, time is wasted in bending the wires to follow the wire layout or plan. Further, in order to route the wires from the inside of the structure along the rim of the structure, it is usually necessary that a man work inside the structure in very cramped quarters and literally force the wires into their proper position. The result is that it takes excessive time to route and lay the wires to a single large structure which, of course, increases the economic cost of the structure being wired.

In view of the above, it is an object of the present invention to provide a method and apparatus for routing and laying wires in large frame structures.

Another object of the present invention is to provide a novel method and apparatus for automatically routing wires and thereafter laying the wires in predetermined positions in large frame structures.

Another object of the present invention is to provide novel apparatus for clamping a plurality of wires, which apparatus may have three degrees of movement so as to permit routing the wires in multiple planes as desired.

Another object of the present invention is to provide apparatus for permitting proper identification of the wires being routed and layed.

Another object of the present invention is to provide novel apparatus for cradling the wires adjacent their intended position during their routing and to permit the wires to be bent and follow a predetermined path.

In addition, another object of the apparatus for cradling wires is to permit, at the termination of wiring, the movement of the wires into their predetermined intended position.

Another object of the present invention is to provide a method of routing a plurality of wires simultaneously in large structures, comprising the steps of providing a clamp having three degrees of movement, clamping a plurality of wires in the clamp, moving the clamp consecutively in at least two of the degrees of movement, providing at at least each point of change of movement of the clamp a wire cradle, and during movement of the clamp engaging said wires in the cradles, and terminating the movement of the clamp and moving the cradles into a position to unload the wires from the cradles into predetermined positions.

Other objects and a fuller understanding of the invention may be had by referring to the following specification and claims taken in connection with the accompanying drawings, in which:

Figure 1:
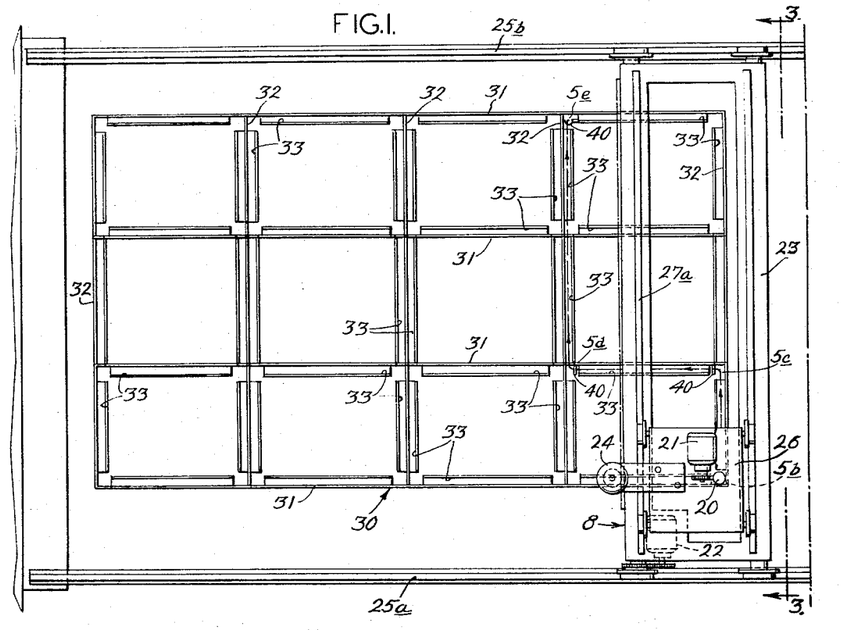
FIG. 1 is a plan view of apparatus constructed in accordance with the present invention and positioned to route and lay wires in a large structure.
Figure 2:
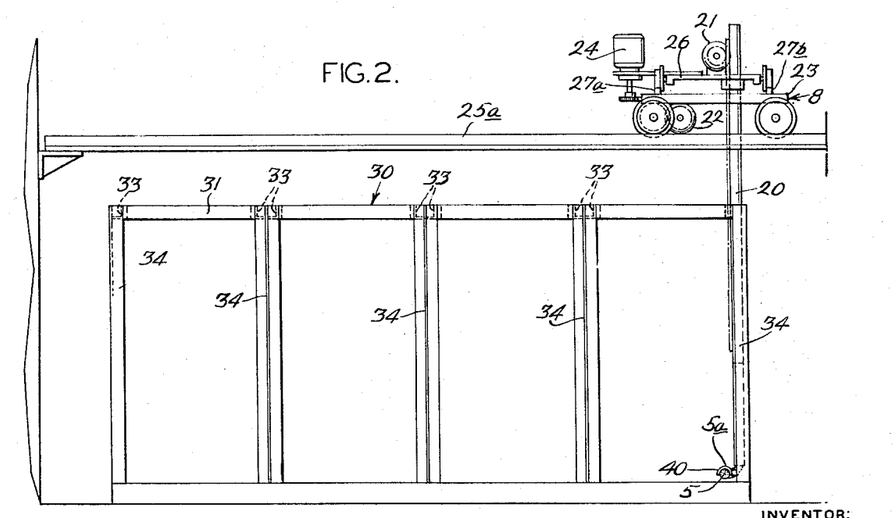
FIG. 2 is a side elevation of the apparatus illustrated in FIG. 1.

Referring now to the drawings and especially FIGS. 1, 2, 3, and 10, a wire clamp 10 connected to and depending from a boom 20 is provided with three degrees of freedom or movement via a crane 8. The crane 8 provides the movement by way of three separate clamp drive means, in the present instance comprising a boom motor 21 for raising and lowering the boom 20 in the vertical plane, a bridge motor 22 connected to a bridge car or platform 23 to drive it longitudinally or in the horizontal plane, and a trolley motor 24 mounted on a trolley 26 to move the boom 20 and thus the clamp 10 in a direction perpendicular to the direction of motion of the bridge 23, but in the same plane. As illustrated in FIGS. 1 and 2, the bridge 23 moves in a horizontal plane on a pair of tracks 25a and 25b while the bridge motor 24, connected to the trolley 26 drives the boom 20 crosswise or between the tracks 25a and 25b via a pair of tracks or the like 27a and 27b mounted on the bridge. Thus, as viewed in FIG. 2, the boom is afforded not only an up and down motion, but a right and left motion and an into and out of the paper motion as well.

For purposes of illustration, beneath the wiring crane is a frame structure 30, such as a control or relay panel frame having longitudinal and cross stiffeners 31 and 32 respectively, located in the upper portion of the structure 30. The stiffners support wiring troughs 33 for receiving therein a plurality of wires in a predetermined route for interconnection between adjacent units and connection interiorly of the structure 30. As noted in FIG. 2, the frame structure has a plurality of uprights 34 supporting the stiffners, and having the panel fronts (not shown) removed for access to the interior of the structure 30.

In accordance with the invention, the wire clamp 10 engages a pre-selected plurality of wires 5 (see FIGS. 3 and 4), and upon operation of the boom 20 through at least two of its degrees of freedom, serves to route, upon receipt of signals from an automatic programming and control means 50, and actuation of the various drive means of the crane 8, the wires engaged by the clamp 10. In order to support the wire 5 above the troughs, and to permit bending and routing of the wires at each point of turning such as indicated at 5a, 5b, 5c, 5d, and 5e of FIGS. 1, 3 and 4, movable wire cradles 40 are connected to the frame structure 30, which cradles permit the bending of the wires at the afore-mentioned points. To this end, the cradles 40 comprise an arcuate member, preferably a substantially semicircular interior and exterior periphery 40a and 40b, although any shape having an interior such that it may engage and support or hold wires may be used. The cradles 40 are provided with clamping means 41, which clamping means engage a portion of the structure 30 at the points of change of direction of the clamp 10. For reasons which will be discussed more fully hereinafter, the clamping means 41 supports a cradle drive means in the present instance a geared motor 42, having a gear sprocket 43 for engaging a rack 44 on the peripheral exterior 40b of the cradle. (See FIGS. 5 and 6.) A bracket 45 having a dove-tail or T slot 46 slidably engages a like-formed portion 47 of the cradle 40 to support and guide the cradle. Although the clamping means 41 in the present instance comprises a thumb screw 48 for securing the bracket and thus the cradle 40 to a portion of the structure 30, the clamping means may be positioned above or below any portion of the structure desired, with suitable bracket modification, to raise the cradle 40 above the troughs 33 for reasons which will become more evident hereinafter. It should be noted that the particular cradle illustrated in FIG. 5 and located at position 5a (see FIG. 3), is in the rest position with the cradle in the down position while the position of the cradles 5b–5e are 180° from the position illustrated in FIG. 5 or in the position with the cradles facing upwardly. In addition, to prevent chafing or cutting of the wires as they are supported and/or engaged by the cradles, the interior 40a of the cradle may be lined with a material such as Teflon.

Figure 3:
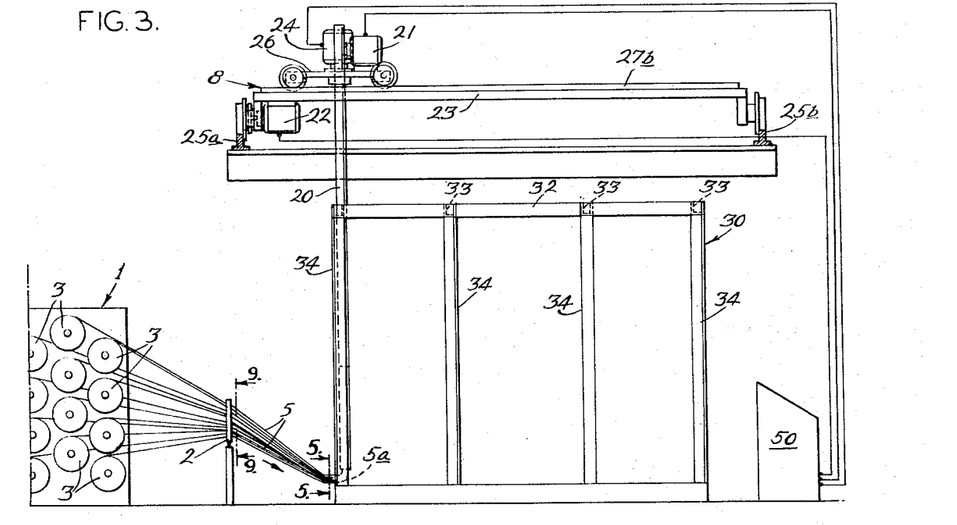
FIG. 3 is an end elevation of the apparatus illustrated in FIG. 1 as viewed along line 3—3 thereof, and including additional apparatus constructed in accordance with the present invention.
Figure 4:
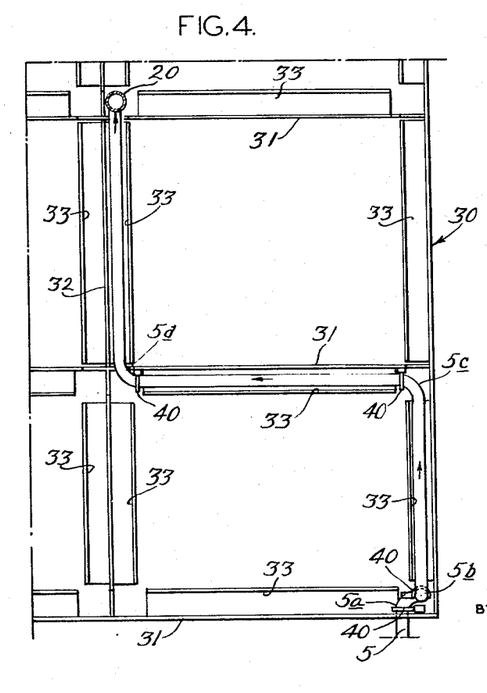
FIG. 4 is a fragmentary enlarged plan view of a portion of the apparatus illustrated in FIG. 1.

As illustrated in FIG. 3, wire storage means 1 having a plurality of spools 3 which may carry different gauge wire, pass through the identification disk 2, into the frame structure 30, under a cradle 40, and are clamped by the wire clamp 10. Upon receipt of an appropriate signal, the boom motor 21 is actuated, elevating the boom 20 in one corner of the structure 30, and the boom is then stopped at a point above the structure overlying a trough 33 and a second cradle 40. The trolley motor 24 is then actuated for a predetermined time, i.e. so that the distance per unit time multiplied by the time equals the length of a particular trough 33 (see FIG. 4) and then upon actuation of the bridge motor 22 for another predetermined time period, and finally upon further actuation of the trolley 26 and the boom 20 the plurality of wires 5 is laid into the appropriately positioned cradles 40.

Figures 8, 9:
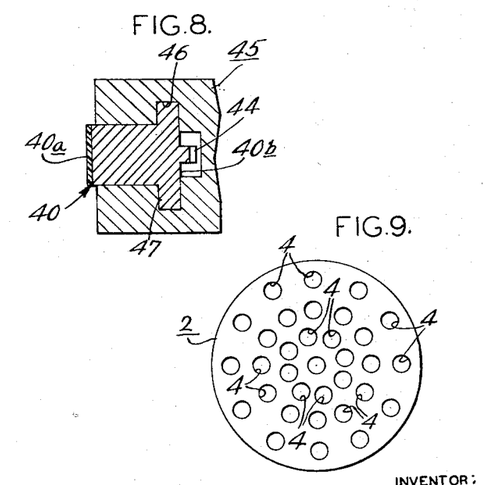
FIG. 8 is a fragmentary sectional view taken along line 8—8 of FIG. 5.
FIG. 9 is an enlarged fragmentary sectional view taken along line 9—9 of FIG. 3.
Figure 10:
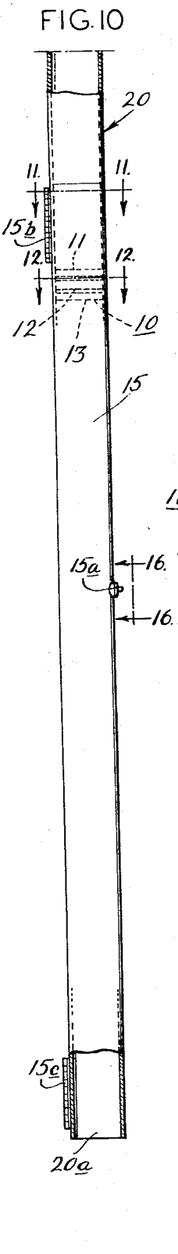
FIG. 10 is an enlarged fragmentary profile of a portion of the apparatus illustrated in FIGS. 2 and 3.
Figure 11:
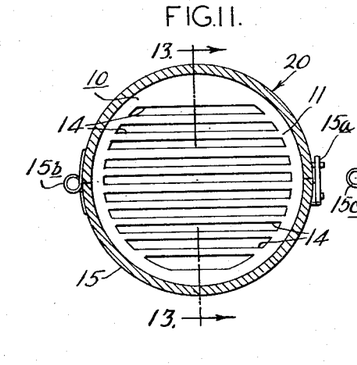
FIG. 11 is an enlarged fragmentary sectional view taken along line 11—11 of FIG. 10.
Figure 12:
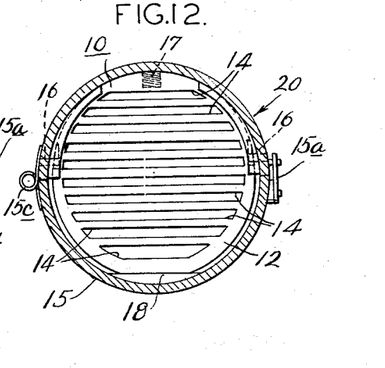
FIG. 12 is an enlarged fragmentary sectional view taken along line 12—12 of FIG. 10.
Figure 13:
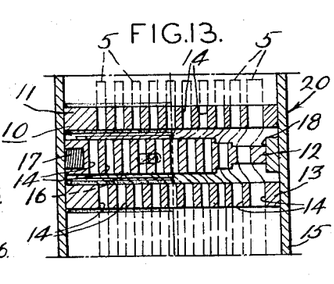
FIG. 13 is a fragmentary sectional view taken along line 13—13 of FIG. 11 with certain of the apparatus in a first position.
Figure 14:
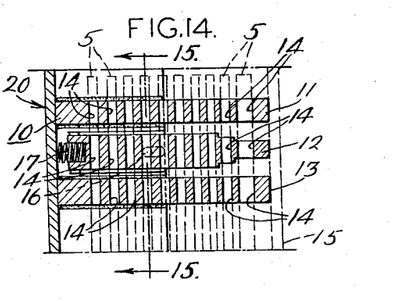
FIG. 14 is identical to FIG. 13 except with the apparatus in a second position.
Figure 15:
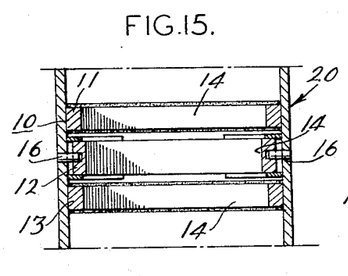
FIG. 15 is an enlarged sectional view taken along line 15—15 of FIG. 14.
Figure 16:
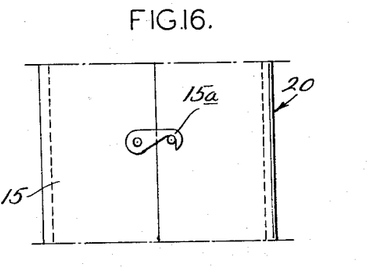
FIG. 16 is an enlarged elevational view, as viewed from line 16—16 of FIG. 10.

In order that the wires being routed and layed across the cradles 40 may be properly identified, the wire identification means or disk 2 has a plurality of apertures 4, as illustrated in FIG. 9, which disk may contain suitable indicia for identifying the gauge and/or identification number of the wires passing through the individual aperture. Prior to clamping the wires in the clamp 10 it is preferable to tag the wires in accordance with the identifying indicia on the disk. From the wire identification disk 2, and as previously stated, the wires are then passed through the open front of the structure 30, beneath a cradle 40, and connected within the structure to the clamp 10. As noted in FIGS. 10–16 the clamp may be positioned interiorly of the boom 20 adjacent the lower portion thereof. Preferably, the clamp should be of the easy action type so that the wires may be easily engaged and disengaged therefrom.

To this end, and in accordance with another feature of the invention, at least the lower portion of the boom 20 is preferably tubular or hollow and is provided with a longitudinally-hingedly bifurcated portion or door 15 to provide access to the interior thereof. As illustrated in FIGS. 10–14, the clamp 10 is positioned spaced from the lower terminal edge 20a of the boom 20 to permit short lengths of wire to project into the lower portion of the boom. The clamp 10 comprises, in the present instance, three grids, 11, 12, and 13 having varying size slots 14 therein to receive different gauge wires. The door 15 of the boom 20 has a latch 15a and longitudinally spaced hinges 15b and 15c which provide access to the grids 11, 12, and 13. In order to firmly grasp the wires 5 as they are placed in the clamp, the grids 11 and 13 are rigidly connected to the boom 20, while the median grid 12, on the other hand, is loosely pinned as at 16 to the boom 20 and biased by a spring 17 to a position where the slots 14 are in axial alignment when the door 15 is open. Interiorly of the door 15 is a biasing block 18 which, upon the wires being inserted through the slots 14, and the door 15 closed, moves against the median grid 12 thereby crimping the wires 5 and holding them in firm engagement in the clamp.

Figure 29:
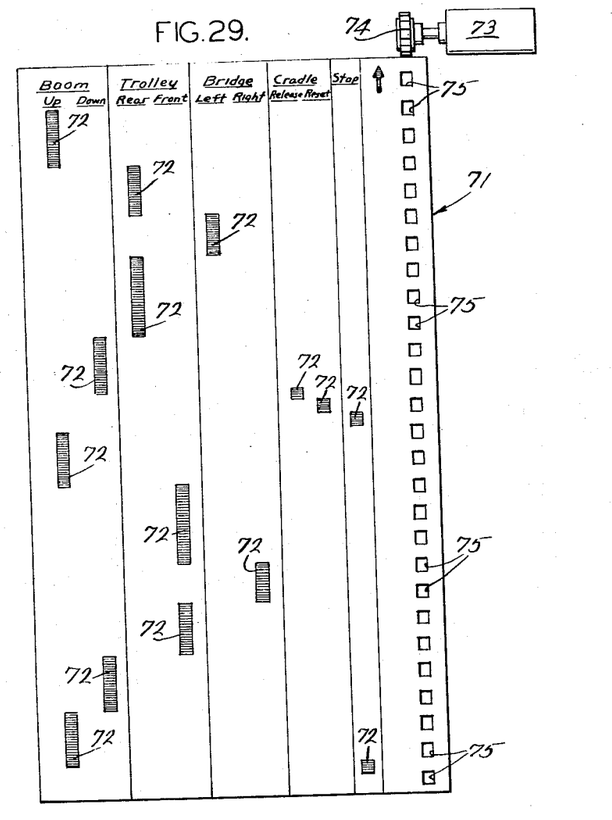
FIG. 29 is a schematic diagram of an automatic programming means utilized in conjunction with the apparatus of the present invention to automatically route wires as illustrated in FIGS. 17 through 28; and, FIG. 30 is a schematic diagram of a control means for controlling, in connection with the automatic programming means, the apparatus of the present invention to route wires as illustrated in FIGS. 17 through 28.

In order that the wires may be laid and routed automatically, so that the operator only has to insert the wires in the clamp prior to commencing wiring and remove the same from the clamp at the termination of wiring, the automatic programming and control means provides for automatic routing and laying of the wires into the troughs 33 in accordance with a predetermined wire layout or plan. In the present instance, the automatic programming and control means 50 comprises a programming means 71 and a reader and signal control means 51 to control the movement of the crane 8 and other apparatus necessary to provide the routing and laying of the wire. As illustrated in FIG. 29, the programming means 71 may comprise a punched card or punched tape having therein a plurality of punches 72 of an axial length corresponding to the distance and rate of movement of the boom 20, trolley 26, or bridge 23.

As illustrated in FIG. 29, the programming means 71 is divided longitudinally into, in the present instance, five columns, which for clarification are labeled, boom up and down, trolley rear and front, bridge left and right, cradle release and reset, and stop. The programming means 71 may be driven by program drive means 73, having a sprocket 74 for registering with suitable apertures 75 in the programming means 71. Preferably, the program drive means 73 drives the programming means at a rate bearing a definite ratio to the drive rates of the drive means for the crane 8 whereby the longitudinal or axial lengths of the punches 72 correspond to the distance moved by the boom, trolley, or bridge.

Figure 30:
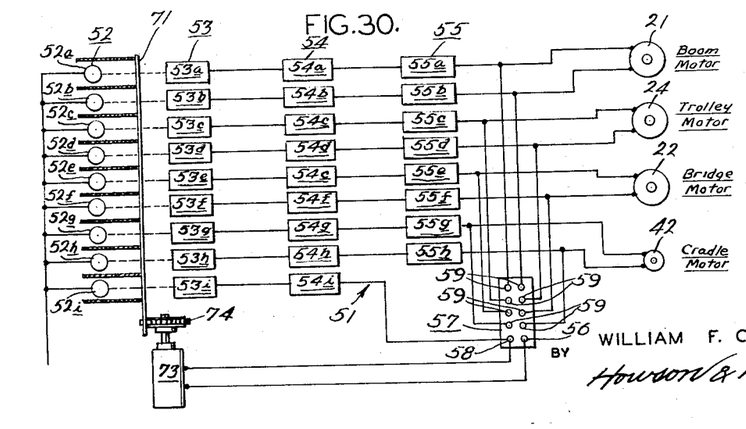

As illustrated schematically in FIG. 30, the reader and signal control means 51 is provided to control the movement of the crane 8 and the cradles 40, and upon reading the programming means 71 interpret the punches and signal the various drive means of the crane 8 or the cradles 40. To this end, the reader and signal control means 51 comprises a plurality of lights 52 each aligned for registry with a particular longitudinal column of the programming means 71 so that when an aperture in the programming means aligns with the particular light associated therewith, light will pass through the programming means and impinge upon a photocell 53. The lights and the photocells are aligned perpendicular to the columns of the programming means 71 in order that the apertures 72 in any particular horizontal section of the programming means 71 will permit the photocell associated therewith to conduct. For purposes of identification, the lights 52 aligning with the longitudinal columns are designated with subletters as are the photocells 53; the lights 52a and 52b aligning with photocells 53a and 53b and corresponding to the boom up and down columns; the lights 52c and 52d, aligning with photocells 53c and 53d and corresponding to the longitudinal columns, trolley rear and front; the lights 52e and 52f aligning with photocells 53e and 53f and corresponding to the longitudinal columns, bridge left and right; the lights 52g and 52h aligning with photocells 53g and 53h and corresponding to the cradle release and reset; and the light 52i aligning with the photocell 53i and corresponding to the longitudinal column for the stop. Upon a particular photocell seeing its associated light 52, the photocell conducts, the signal being amplified in an amplifier 54, in the present instance each photocell having its own amplifier designated 54a through–54i for purposes of identification, which amplifier actuates a relay 55, also appropriately designated 55a through 55h, which applies a signal to the crane drive means to cause the desired motion, the cradle drive means or motors 42, or to a power stop switch 56.

In order to permit actuation of the program drive means 73, the stopping or starting of the signal control means 51, or the manual actuation of any of the crane drive means or the clamp motors, a manual switch panel 57 electrically connects the crane and cradle drive means for manual operation thereof. The manual switch panel 57, in addition to carrying the power stop switch 56, carries a power on switch 58 and pairs of switches 59 for moving the boom, trolley, and bridge and cradles for driving them manually as desired.

FIGS. 17 through 28 are schematic illustrations of the frame structure 30 as if the uprights 34 were placed in the same plane (i.e. horizontal) as the stiffners 31 and wiring troughs 33. These sketches are merely illustrative of exemplary wiring and routing plans for typical frame structures such as the structure 30, and it should be recognized that various structures may require modification of the illustrated routing plans.

The operation of the programming and control means 50 may best be depicted by means of an example. The routing plans shown in FIG. 17 is illustrative, and the programming means 71 illustrated in FIG. 29 contains a plurality of punches 72 corresponding to this routing plan.

Figure 5:
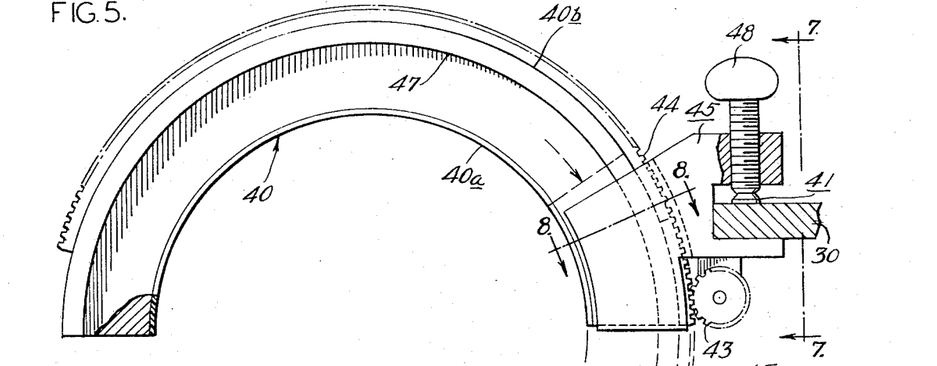
FIG. 5 is an enlarged fragmentary view taken along line 5—5 of FIG. 3.
Figure 6:
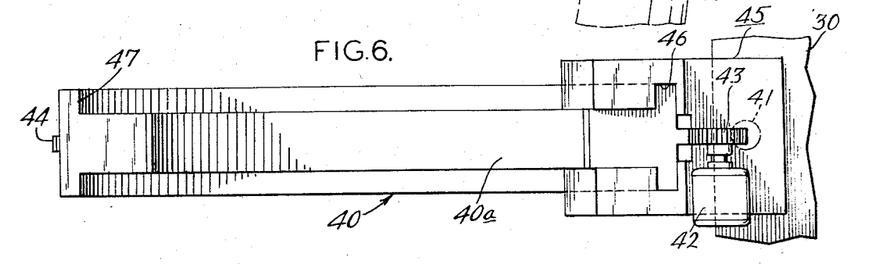
FIG. 6 is a bottom view of the apparatus illustrated in FIG. 5.
Figure 7:
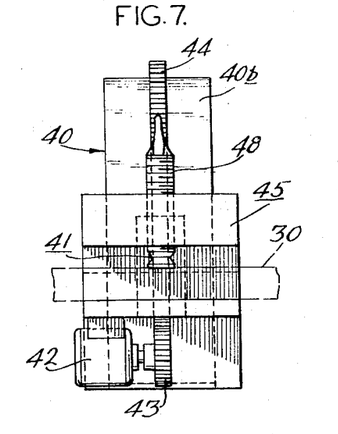
FIG. 7 is a view taken along line 7—7 of FIG. 5.

As previously set forth, a plurality of wires 5 is drawn into the structure 30 near the bottom thereof and underneath a cradle 40 having a rest position as shown in FIG. 5. The wires are then connected to the clamp 10 associated with the boom 20. The programming and control means 50 is then actuated by pressing the power on switch 58 on the control panel 57. This causes the program drive means to index the programming means 71, which as may be seen in FIG. 29, causes the punch associated with "boom up" to register with the light 52a causing the photocell 53a to conduct and which, through the amplifier 54a and relay 55a, causes the boom motor to be actuated to raise the boom. The boom moves toward until the photocell 53a ceases conduction which corresponds to, in the present instance, the length "a" on FIG. 17. As the programming means 71 indexes, the photocell 53c is caused to conduct by the light 52c registering with a punch 72 in the "trolley-rear" column. Once again, in a manner as heretofore described, the trolley motor causes the trolley to move to the rear a distance "b" as illustrated in FIG. 17. It is noted, in passing, that another cradle 40 is provided at the termination of boom movement and at the beginning of trolley movement and so on at all places of change of direction of the clamp 10 associated with the boom 20.

Figure 17:
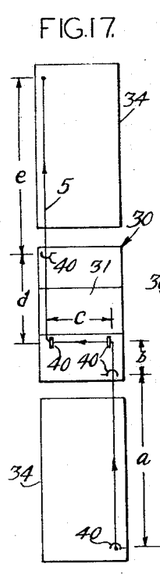
FIGS. 17–28 are schematic illustrations of a typical large frame structure having side panels opened up to show relevant portions of the structure in one plane, and illustrating exemplary wire routing plans for large frame structures.
Figures 18, 19, 20:
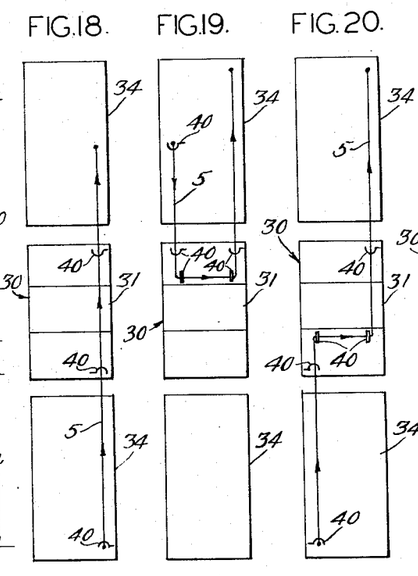
Figures 21, 22:
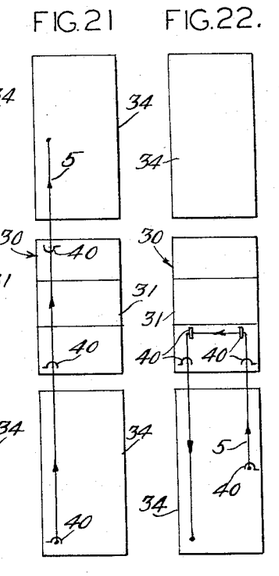
Figures 23, 24:
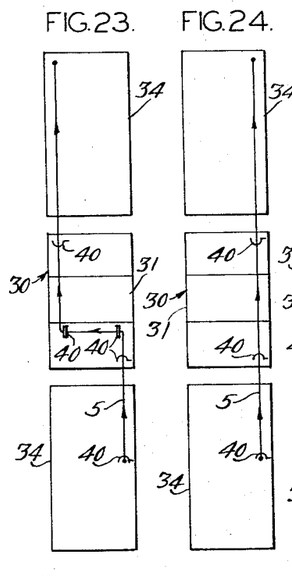
Figures 25, 26, 27, 28:
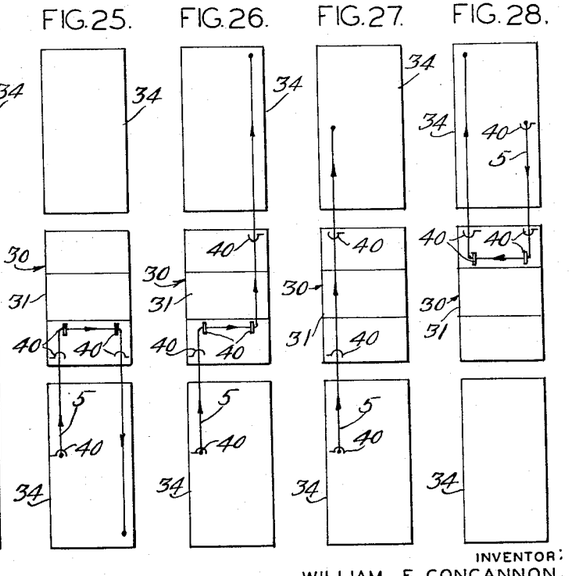

Thereafter, the photocell 53e is caused to conduct by registry of a punch 72 in the "bridge-left" column with the lamp 52e thereby causing the bridge motor to receive a signal causing it to move the bridge a distance "c" as illustrated in FIG. 17. Upon further indexing of the programming means 71, another aperture or punch 72 in the "trolley-rear" column causes the photocell 53c to conduct moving the trolley rearwardly, as seen in FIG. 17, a distance "d." Thereafter, further indexing of the programming means permits the photocell 53b to conduct by registry with a punch in the column of the programming means 71 labeled "boom-down" which causes the boom motor to be actuated thereby lowering the boom a distance "e" as seen in FIG. 17.

Further indexing of the porgramming means 71 causes registry of the card with a punch in the "cradle-release" column of the light 52g with the photocell 53g causing the cradles to move and drop the wires 5, into the respective troughs 33. Immediately thereafter, the aperture in the "cradle reset" column causes the energizing of the photocell 53b which causes the clamps to reset. Simultaneously therewith, an aperture in the programming means 71 in the stop column, causes the power stop switch 56 to be actuated via the photocells 53i shutting down the reader and signal control means 51 and the program drive means 73 connected thereto.

After the reader and signal control means 51 as well as the programming means 71 has been stopped, the wires are removed from the clamp 10, as heretofore described, and the power on switch 58 is once again actuated. As may be noted in the remainder of the programming means 71, by tracing the punches in the columns associated with the boom, trolley, bridge, and stop column, the crane moves through the same cycle in reverse and thus retraces its steps back to the starting position so that it may receive additional wires, if necessary, to follow out a new routing plan. Of course, it is understood that the boom may be caused to move back to any position desired for connection of wires to the clamp 10 so that it may follow any desired plan.

In summary, a method and apparatus for routing and laying wires in large frame structures is provided, which apparatus has three degrees of movement so as to permit routing the wires in multiple planes as desired. Further, by the novel method and apparatus of the present invention, wires may be automatically routed and layed in predetermined positions in accordance with a predetermined routing plan.

Although the invention has been described with a certain degree of particularity, it is understood that the present disclosure has been made only by way of example and that numerous changes in the method of operation, details of construction and the combination and arrangement of parts may be made without departing from the spirit and the scope of the invention as hereinafter claimed.

What is claimed is:

1. A method of routing a plurality of wires simultaneously in large structures, comprising the steps of: providing a clamp having three degrees of movement, clamping a plurality of wires in said clamp, moving the clamp consecutively in at least two of said degrees of movement, providing at least each point of change of movement of the clamp a wire cradle, and during movement of the clamp, engaging said wires in said cradles and terminating the movement of the clamp and moving the cradles into a position to unload the wires from the cradles into predetermined positions.

2. A method of routing a plurality of wires in accordance with claim 1 including the steps of: providing a programming means having a predetermined routing plan thereon, and a reader and signal means connected to said clamp, reading said programming means with said reader and controlling the movement of said clamp with said reader in accordance with said plan.

3. Apparatus for routing and laying wires in a frame structure having means for receiving wires therein, said apparatus comprising a crane positioned above said structure, a boom depending from said crane and movably connected thereto, said crane having drive means to move said boom in at least three degrees of movement, a wire clamp connected to said boom adjacent the lower end thereof for receiving and clamping a plurality of wires, a plurality of wire cradles having a clamping portion and a wire engaging and carrying portion, said cradles mounted by said clamping portion to said structure at points of intended change of movement in routing of said wires and superimposed on said means to receive said wires, and means on said cradles to cause the wires engaged and carried thereby to be placed in said means in said structure as desired.

4. Apparatus in accordance with claim 3 wherein said crane comprises a trolley having a first drive means to move said boom in a first one of said degrees of movement, a bridge having drive means to move said boom in a second one of said degrees of movement relative to said trolley, and a third drive means connected to said boom to move said boom in a third one of said degrees of movement relative to said trolley.

5. Apparatus in accordance with claim 4 including an automatic programming and control means, said automatic programming and control means comprising a programming means having means thereon corresponding to a predetermined routing plan for said crane, and a reader and control means electrically connected to said crane drive means, said reader positioned to read the predetermined routing plan on said programming whereby the movement of said crane is controlled according to said plan.

6. Apparatus in accordance with claim 5 wherein said means corresponding to said predetermined routing plan of said wires comprises a plurality of punches arranged in columns in said programming means, said reader comprising a plurality of photocells aligned with a plurality of lights, said programming means interposed between said photocells and said lights whereby upon alignment of a photocell and light with a punch, said photocell conducts thereby causing actuation of said crane drive means.

7. Apparatus in accordance with claim 6 wherein said reader electrically connects said cradles whereby upon termination of a definite plurality of changes of movement of said boom said cradles are caused to move and lay said wires in said means to receive them.

8. Apparatus in accordance with claim 3 wherein at least the lower portion of said boom is hollow, a longitudinally extending-hingedly bifurcated portion forming a door in said boom at the lower portion thereof, said clamp mounted interiorly of said boom confronting said door.

9. Apparatus in accordance with claim 3 wherein at least the lower portion of said boom is hollow, a longitudinally extending, hingedly bifurcated portion forming a door in said boom at the lower portion thereof, and wherein said clamp comprises at least a pair of grids having slots therein to receive wires and mounted interiorly of said boom confronting said door, one of said grids movable with respect to the other of said grids, the slots of one of said grids aligning longitudinally of the slots of said other of said grids when said door is open, means mounted interiorly of said door aligning with said one movable grid to engage said grid and cause it to move relative to said other grid upon closing of said door whereby wires axially positioned in said slots of said grids are crimped and firmly held thereby.

10. Apparatus for routing and laying wires in a frame structure in accordance with claim 3 wherein said wire engaging and carrying portion of said cradles comprises an arcuate member having a substantially semicircular interior, and wherein said clamping portion comprises a bracket slidably engaging said member and having mounted thereon a clamp for mounting of said cradles onto said structure, a drive means mounted on said bracket and engaging said arcuate member whereby upon actuation of said drive means said arcuate member is caused to move relative to said bracket.

11. Apparatus for routing and laying wires in a frame structure having means for receiving wires therein, said apparatus comprising a crane positioned above said structure, a boom depending from said crane and movably connected thereto, said crane comprising a trolley having a first drive means to move said boom in a first degree of movement, a bridge having drive means to move said boom in a second degree of movement perpendicular to said first degree of movement, and a third drive means connected to said boom to move said boom in a third degree of movement perpendicular to the plane formed by said first and second degrees of movement, a wire clamp connected to said boom adjacent the lower end thereof for receiving and clamping a plurality of wires, a plurality of wire cradles having a clamping portion and a wire engaging and carry portion, said cradles mounted by said clamping portion to said structure at points of intended change of movement in routing of said wires and superimposed on said means to receive said wires, and means on said cradles to cause the wires engaged and carried thereby to be placed in said means in said structure as desired.

12. Apparatus in accordance with claim 11 including an automatic programming and control means, said automatic programming and control means comprising a programming means having means thereon corresponding to a predetermined routing plan for said crane, and a reader and control means electrically connected to said crane drive means, said reader positioned to read the predetermined routing plan on said programming whereby the movement of said crane is controlled according to said plan.

13. Apparatus in accordance with claim 12 wherein said means corresponding to said predetermined routing plan of said wires comprises a plurality of punches arranged in columns in said programming means, said reader comprising a plurality of photocells aligned with a plurality of lights, said programming means interposed between said photocells and said lights whereby upon alignment of a photocell and light with a punch, said photocell conducts thereby causing actuation of said crane drive means.

14. Apparatus in accordance with claim 13 wherein said reader electrically connects said cradles whereby upon termination of a definite plurality of changes of movement of said boom, said cradles are caused to move and lay said wires in said means to receive them.

15. Apparatus in accordance with claim 11 wherein at least the lower portion of said boom is hollow, a longitudinally extending-hingedly bifurcated portion forming a door in said boom at the lower portion thereof, said clamp mounted interiorly of said boom confronting said door.

16. Apparatus in accordance with claim 11 wherein at least the lower portion of said boom is hollow, a longitudinally extending, hingedly bifurcated portion forming a door in said boom at the lower portion thereof, and wherein said clamp comprises at least a pair of grids having slots therein to receive wires and mounted interiorly of said boom confronting said door one of said grids movable with respect to the other of said grids, the slots of one of said grids aligning longitudinally of the slots of said other of said grids when said door is open, means mounted interiorly of said door aligning with said one movable grid to engage said grid and cause it to move relative to said other grid upon closing of said door whereby wires axially positioned in said slots of said grids are crimped and firmly held thereby.

References Cited by the Examiner

UNITED STATES PATENTS

| | | | |
|---|---|---|---|
| 2,969,827 | 1/1961 | Rosenthal et al. | 140—93 X |
| 2,976,894 | 3/1961 | Philip | 140—93 |
| 3,186,077 | 1/1965 | Vickery | 140—93 |

WILLIAM J. STEPHENSON, *Primary Examiner.*